United States Patent [19]

Bandy et al.

[11] Patent Number: 5,295,507

[45] Date of Patent: Mar. 22, 1994

[54] CONTAINMENT VALVE THAT ALLOWS CONTAMINATION FREE TRANSFER

[75] Inventors: Michael J. Bandy, Greenwood; Roy H. Byerly; Robert T. Spoonmore, both of Indianapolis, all of Ind.

[73] Assignee: Eli Lilly and Company, Indianapolis, Ind.

[21] Appl. No.: 954,402

[22] Filed: Sep. 29, 1992

Related U.S. Application Data

[63] Continuation-in-part of Ser. No. 827,357, Jan. 29, 1992, Pat. No. 5,150,735.

[51] Int. Cl.$^5$ ............................................. F16L 37/28
[52] U.S. Cl. ........................... 137/614.06; 137/614.01; 251/305
[58] Field of Search .............. 137/614.06, 614, 614.01; 251/305

[56] References Cited

U.S. PATENT DOCUMENTS

| | | | |
|---|---|---|---|
| 2,333,496 | 11/1943 | Townhill et al. | |
| 2,426,471 | 8/1947 | Snyder | 137/614.06 |
| 2,712,454 | 7/1955 | Love | |
| 3,106,223 | 10/1963 | Cooper | 137/614.01 |
| 3,159,180 | 12/1964 | Courtot et al. | 137/614.06 |
| 4,438,779 | 3/1984 | Allread | 137/614.06 |
| 4,515,182 | 5/1985 | LeDevehat | 137/614.06 |
| 5,095,946 | 3/1992 | McLennan | |
| 5,150,735 | 9/1992 | Bandy et al. | 137/614.06 |

FOREIGN PATENT DOCUMENTS

| | | |
|---|---|---|
| 8705947 | 5/1989 | Brazil . |
| 0447023 | 9/1991 | European Pat. Off. . |
| 1465143 | 1/1976 | Fed. Rep. of Germany . |
| 644676 | 1/1979 | U.S.S.R. . |
| 905149 | 2/1982 | U.S.S.R. . |
| 888541 | 1/1962 | United Kingdom . |

OTHER PUBLICATIONS

Victaulic brochure, Aug. 1, 1991.
Counter Lock'n Load Brochure, 1990.
Spectrum Processor 2 page brochure.
Article entitled "Vacuum Transfer/Sieving for Powder Handling", D&CI, Mar. 1991 (McIntire).
*Muller Drums with Know-how and Service* booklet "1.6.85".
ARAC Project I-7280, Search and Edit Results, 1991.
*STERILE-SEALT Valves,* Garlock Valves and industrial Plastics booklet, 1991.
European Search Report dated Jun. 8, 1993.

*Primary Examiner*—A. Michael Chambers
*Attorney, Agent, or Firm*—Woodard, Emhardt, Naughton, Moriarty & McNett

[57] ABSTRACT

A containment valve with two butterfly valves at the juncture of a first port and a second port with the two valves pivoting on a common transverse axis. The ports may be coupled and uncoupled between a coupled mode and an uncoupled mode. In the uncoupled mode one butterfly valve body locks the first port shut and the other butterfly valve body locks the second port shut to isolate the contents of the ports, such as chemical dust. Each butterfly valve body has a circumferentially moveable annular locking ring moveable between a first position and a second position. In one position the locking ring locks the butterfly valve body shut when the ports are in an uncoupled mode. In the other position the locking rings hold the two ports in the coupled mode. A spring biased pin lock prevents inadvertent rotation of the annular locking ring. Annular ribs and grooves are provided on the mating faces of the butterfly valve bodies. The ports are hermaphroditic about both the X-axis and the Y-axis.

7 Claims, 9 Drawing Sheets

CONTAINMENT VALVE THAT ALLOWS CONTAMINATION FREE TRANSFER

REFERENCE TO RELATED APPLICATIONS

This application is a continuation-in-part of U.S. patent application Ser. No. 07/827,357, filed on Jan. 29, 1992 entitled CONTAINMENT VALVE THAT ALLOWS CONTAMINATION FREE TRANSFER, issued Sept. 29, 1992 as U.S. Pat. No. 5,150,735.

BACKGROUND OF THE INVENTION

The present invention relate generally to valves, and more specifically relates to butterfly valves which may be coupled and uncoupled without exposing the content of the valves to the outside environment.

Valves are used in material handling such as to regulate the flow of powder in conduits and in and out of containment vessels. In certain applications, it is important to isolate the material from the outside environment. For example, in chemical industries and pharmaceutical industries it may be necessary to isolate a material from the environment to maintain the purity and sterility of the material, to protect the outside environment from toxic or other harmful effects of the material, or both. However, some applications require not only regulation of flow through the valve, but also the ability to separate the conduit and/or containment vessel while maintaining the integrity of the system. This may be especially desirable where chemicals being handled are granular or in the form of a powder.

One prior device is disclosed in Soviet Inventor's Certificate No. 905,149 which shows two spring-biased elliptically shaped butterfly valves which are forced open upon coupling of two conduits. Another device is shown in Brazilian Patent No. PI 8705947A which discloses a three-stage valve used in powder transfer. Another device is shown in Soviet Inventors Certificate No. 644,676 which discloses a valve controlled coupling member with two butterfly valve halves with their axis of rotation at 90° with respect to the direction of flow through the valve and with elastomeric seals. U.S. Pat. No. 3,106,223 discloses a disconnectable coupling with two valve halves on an axis 45° across the port with elastomeric sealing rings and with a bayonet coupling between different ports.

The present invention provides advantages over these prior devices while maintaining a relatively simple design which is interchangeable with corresponding valve halves, and is readily cleaned and sterilized and assembled by the operator.

SUMMARY OF THE INVENTION

The present invention provides a valve system for between a first container port and a second container port, comprising:
a first butterfly valve body pivotable about an axis and a second butterfly valve body pivotable about the axis. The first port and the second port are uncoupleable and coupleable with respect to each other between an uncoupled mode and a coupled mode respectively, wherein the butterfly valve bodies are simultaneously pivotable about the axis to an open position to allow flow of material through the first and second ports. A first locking member is provided which is rotatable circumferentially with respect to the first port from a first circumferential position to a second circumferential position, wherein in the first circumferential position the first locking member locks the first butterfly valve body in a closed position, and wherein in the second circumferential position the first locking member unlocks the first butterfly valve body to allow pivoting of the first butterfly valve body to the open position independently from said locking member.

The present invention further provides a valve system in which butterfly valve bodies and corresponding locking members are interchangeable and have elastomeric seals.

The present invention further provides a valve system with two valve halves and with hermaphroditic ports which will mate across the X-axis and the Y-axis.

One object of the present invention is to provide a containment valve that allows dust free powder transfer.

Another object of the present invention is to provide a valve system which, when separated maintains a vessel in a separate container completely sealed with all exposed surfaces of the valve cleaned before and after connection.

Another object of the present invention is to provide a valve which is accident proof from opening when the system is separated and a valve which provides dust free powder transfer without obstructing the line of powder flow when the system is together.

Another object is to provide a valve system in which the valve pieces are completely cleanable and sterilizable and in which valve halves are identical and fit together interchangeably.

Another object is to provide the foregoing advantages with a valve which does not require a person to reach into a line of powder flow for valve operation and which allows valve operation in either direction so a container can be loaded or unloaded through the same valve.

These and other advantages of the present invention will be apparent from the written description and drawings herein.

DESCRIPTION OF THE PREFERRED EMBODIMENT

Figure 1:
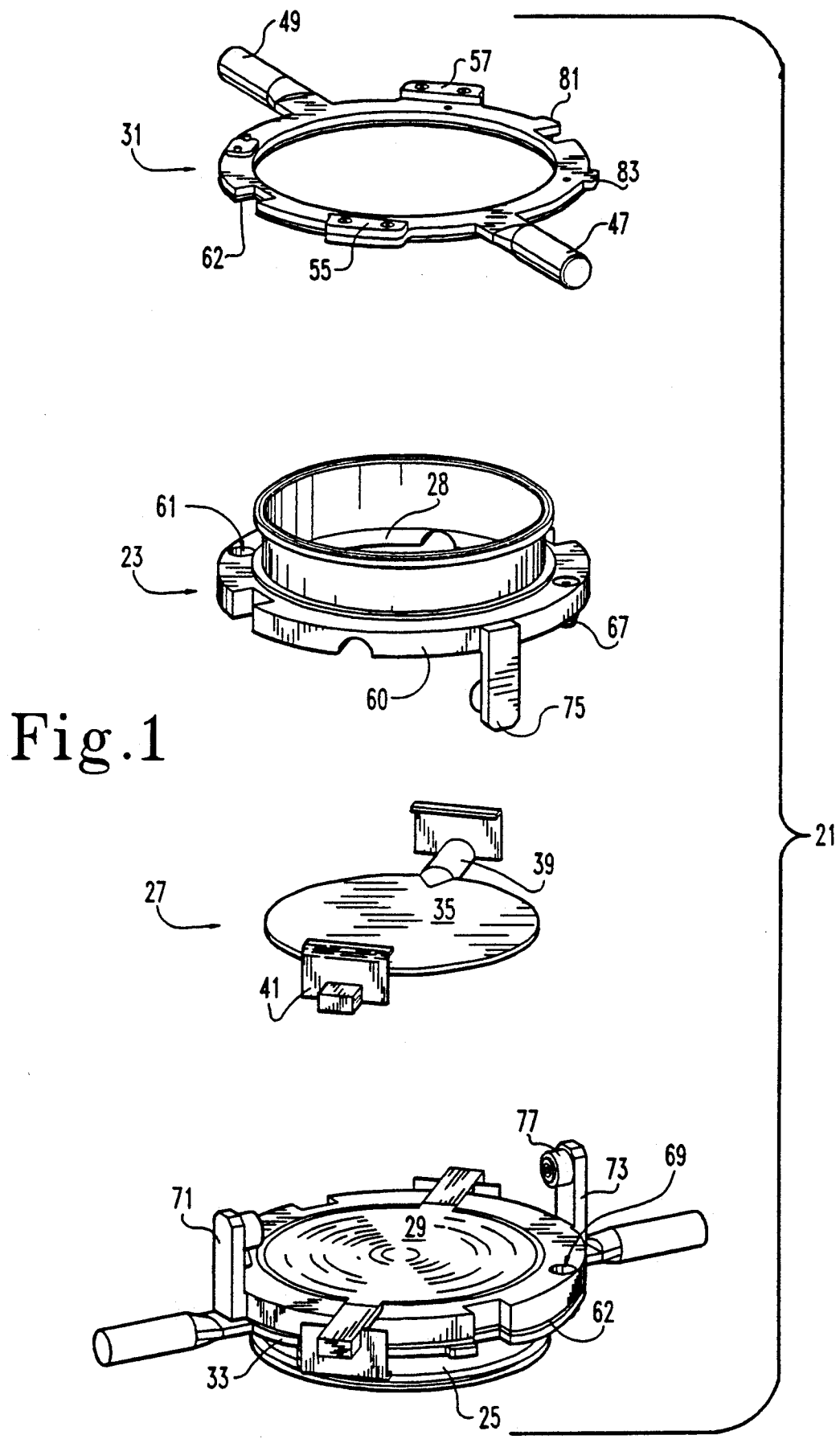
FIG. 1 is a perspective view of one embodiment of the present invention showing one-half of the assembly exploded.
Figure 2:
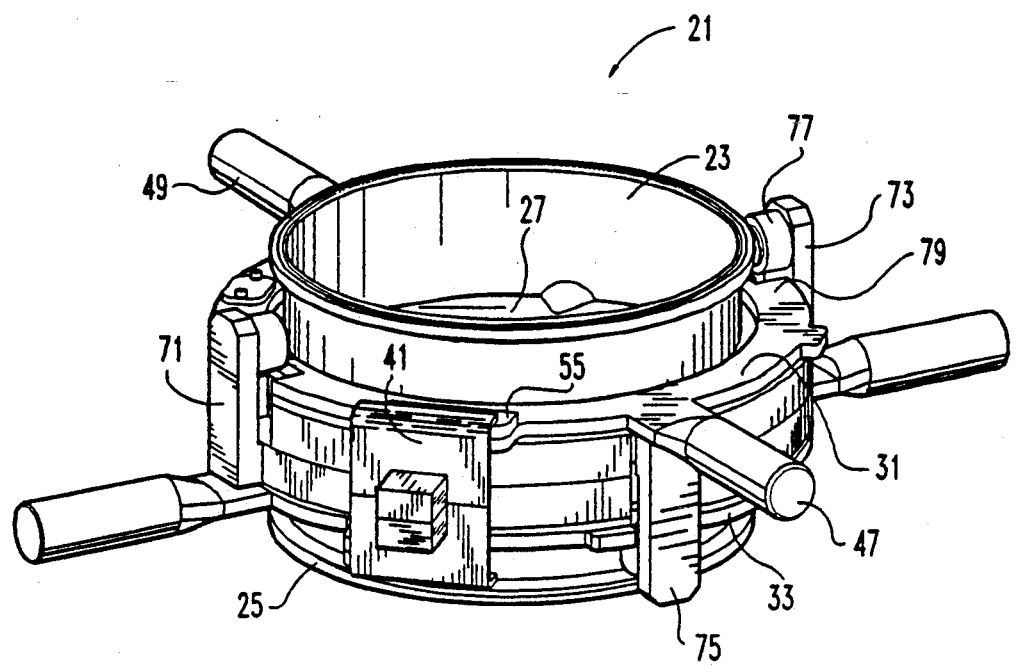
FIG. 2 is a perspective view of the device of FIG. 1 assembled mode and with the butterfly valve bodies closed.
Figure 3:
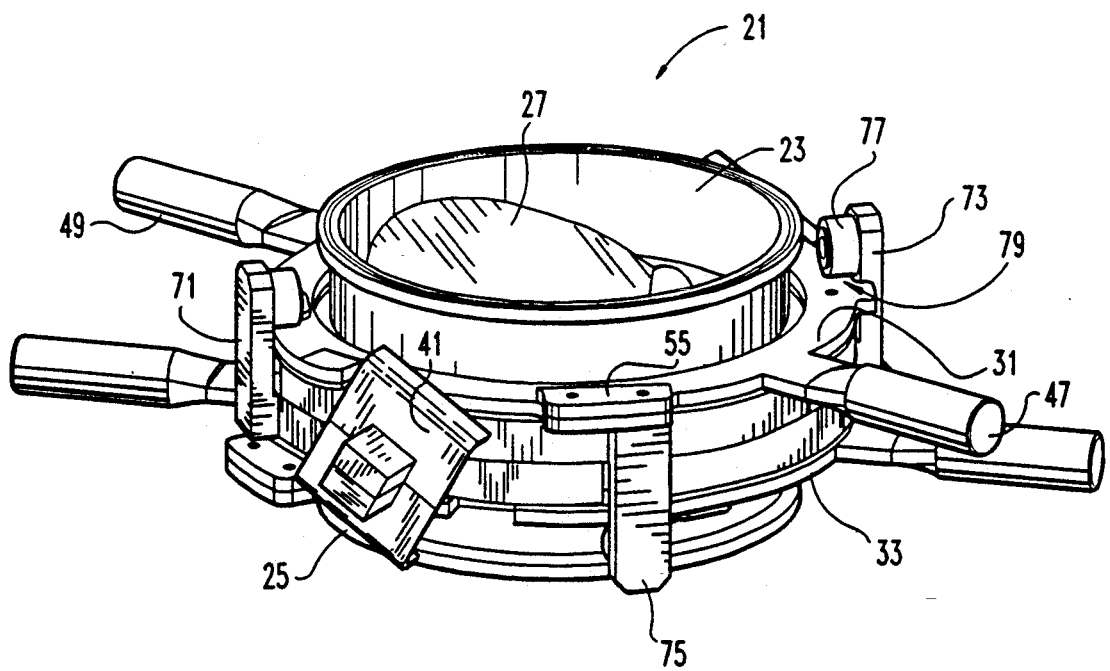
FIG. 3 is a perspective view of the device of FIG. 1 fully assembled in a coupled mode and with the butterfly valve bodies open.
Figure 4:
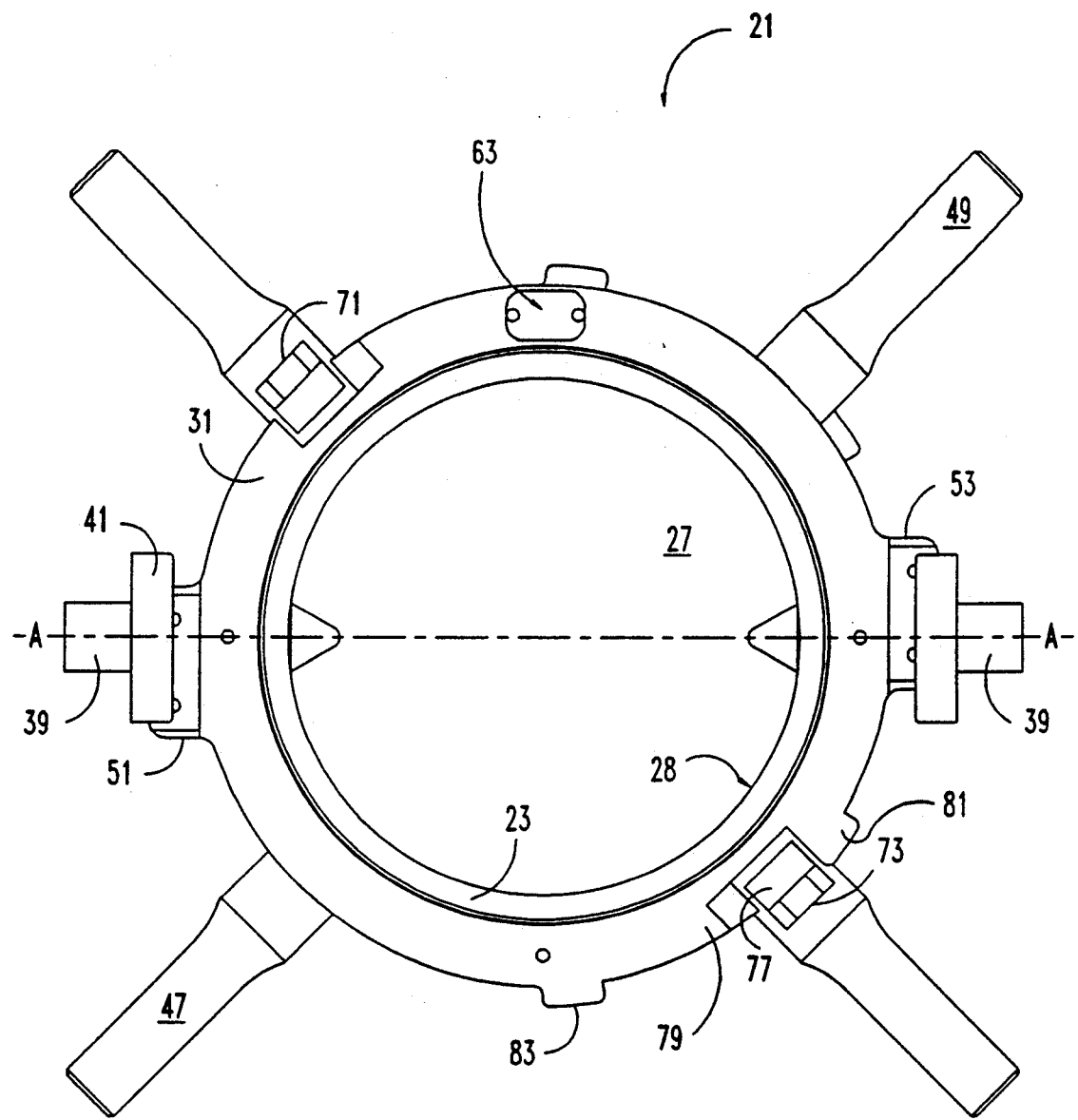
FIG. 4 is a top plan view of the device illustrated in FIG. 2.
Figure 5:
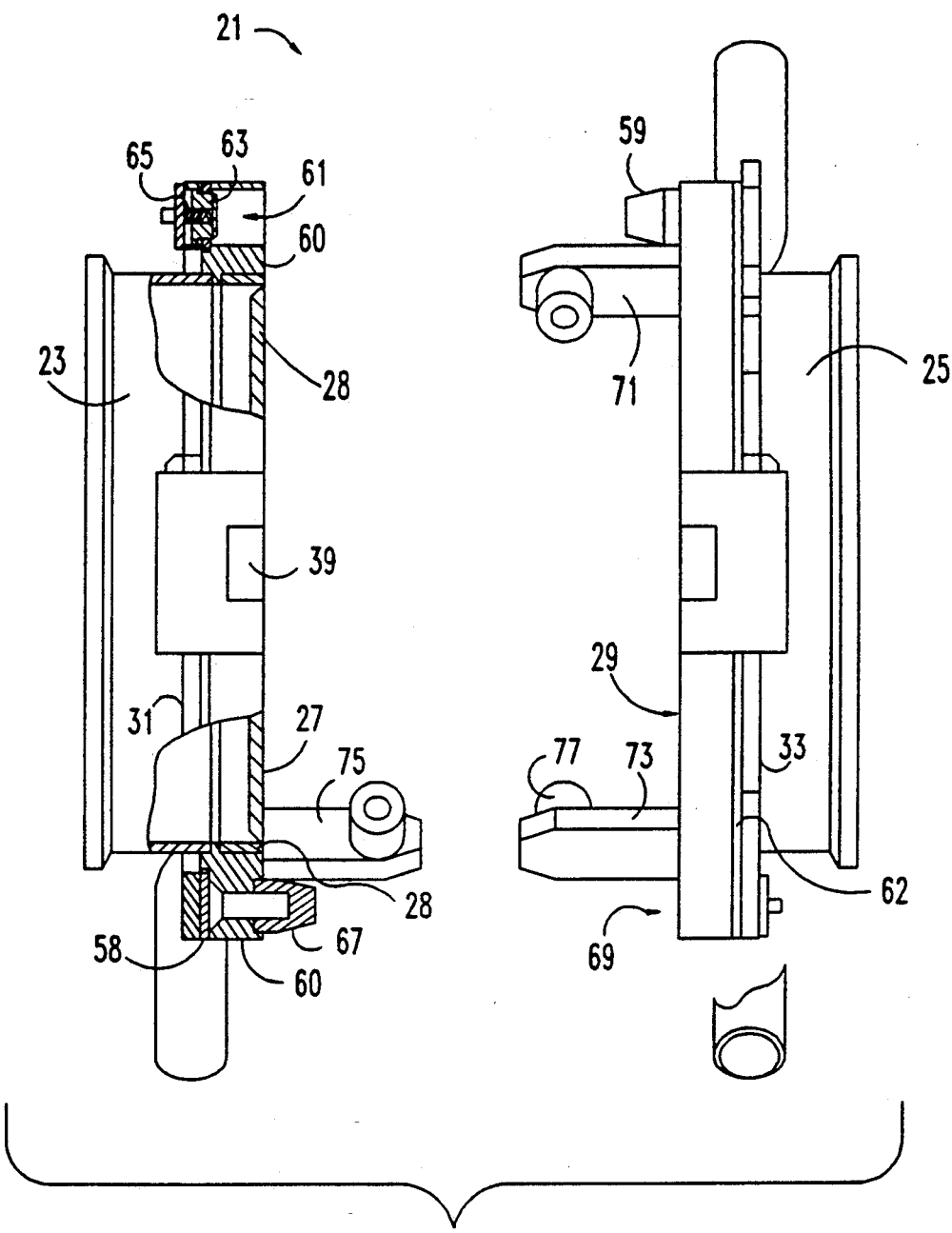
FIG. 5 is a side view of the first embodiment of the present invention shown in an uncoupled mode and partially cut away.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Generally, the invention shown has two container ports 23 and 25 which may be coupled together, and are held together by two pairs of prongs. A butterfly valve opens and closes between the two ports and consists of two halves, valve body 27 and valve body 29. When the container ports are uncoupled, the respective valve bodies separate, keeping each of the two ports sealed closed. Two locking members 31 and 33 lock and unlock the butterfly valve and help couple the two ports together.

Referring to FIGS. 1-10, a single example of the present invention is illustrated as valve system 21. In this embodiment, there are six major components: first container port 23, second container port 25, first butterfly valve body 27, second butterfly valve body 29, first locking member 31 and second locking member 33. As illustrated, the container ports are essentially identical to each other, the butterfly valve bodies are essentially identical to each other and the locking members are essentially identical to each other, resulting in two identical three-part subassemblies (see FIGS. 1 and 5) of the overall valve system Container ports 23 and 25 in use are attached to any one of a variety of conduits, containers, vessels or other chambers in which material to be handled is kept. The invention has particular application with respect to handling and transferring solid materials, such as toxic, sterile and/or corrosive solids, including powders and dusts. However, the present invention has applicability with other solids such as crystals, particulates, granulars and/or tablets useful in the pharmaceutical industry or other industries and may also be used in handling liquids or gases. A key attribute of the present invention is that it allows container port 23 and container port 25 to be separated from one another in an uncoupled mode (see FIG. 5) while maintaining the powder or other material inside the respective container ports, sealed from the outside environment. Conversely, when container port 23 and container port 25 are held together in a coupled mode, the two butterfly valve bodies 27 and 29 pivot together with valve system 21 acting as a valve between container port 23 and container port 25. As illustrated, the container ports include an outer wall defining an inner conduit volume through which the material being handled passes.

Locking member 31 and locking member 33 preferably are annular rings disposed externally around the circumference of container port 23 and container port 25 respectively. The locking members are moveable, preferably through circumferential rotation, with respect to the container ports between a first position and a second position for locking and unlocking the butterfly valve bodies. The locking members act to lock each of their respective butterfly valve bodies closed when system 21 is in an uncoupled mode (FIG. 5) but unlocks them and allows them to pivot about axis A when the container ports are in a coupled mode (e.g. FIG. 3).

Figure 8:
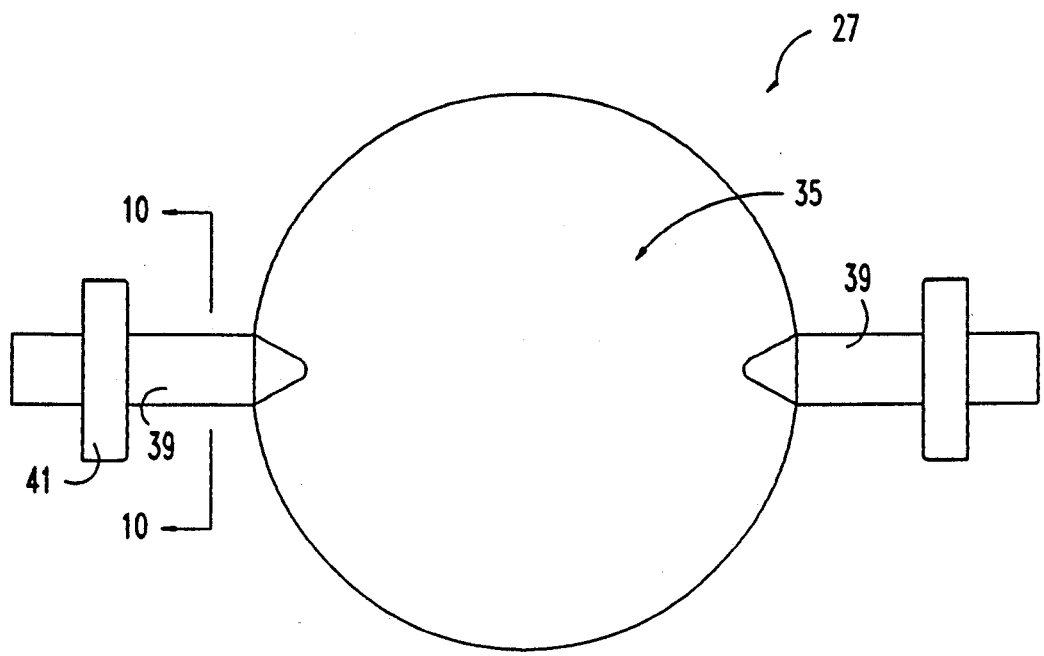
FIG. 8 is a top plan view of one butterfly valve body of the device of FIG. 1 shown in isolation.
Figure 9:
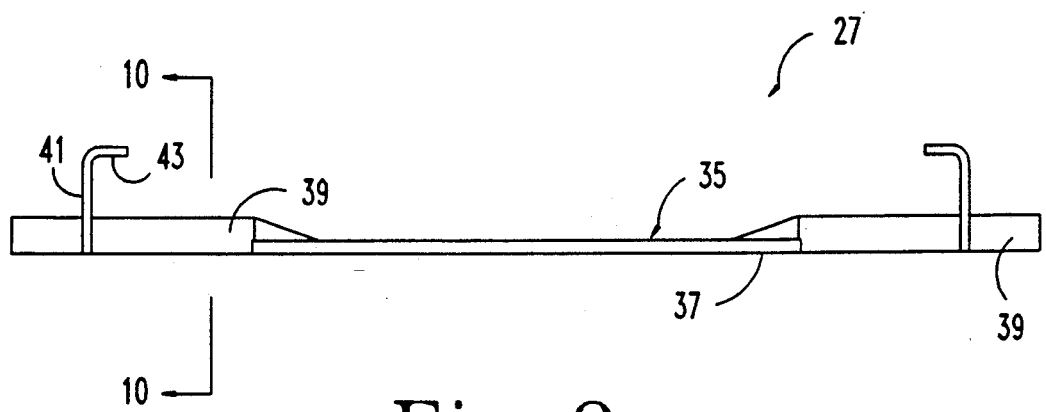
FIG. 9 is a side view of the butterfly valve body of FIG. 8.
Figure 10:
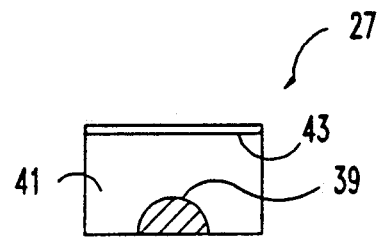
FIG. 10 is a cross-sectional detail taken along lines 10—10 of FIGS. 8 and 9.
Figure 11:
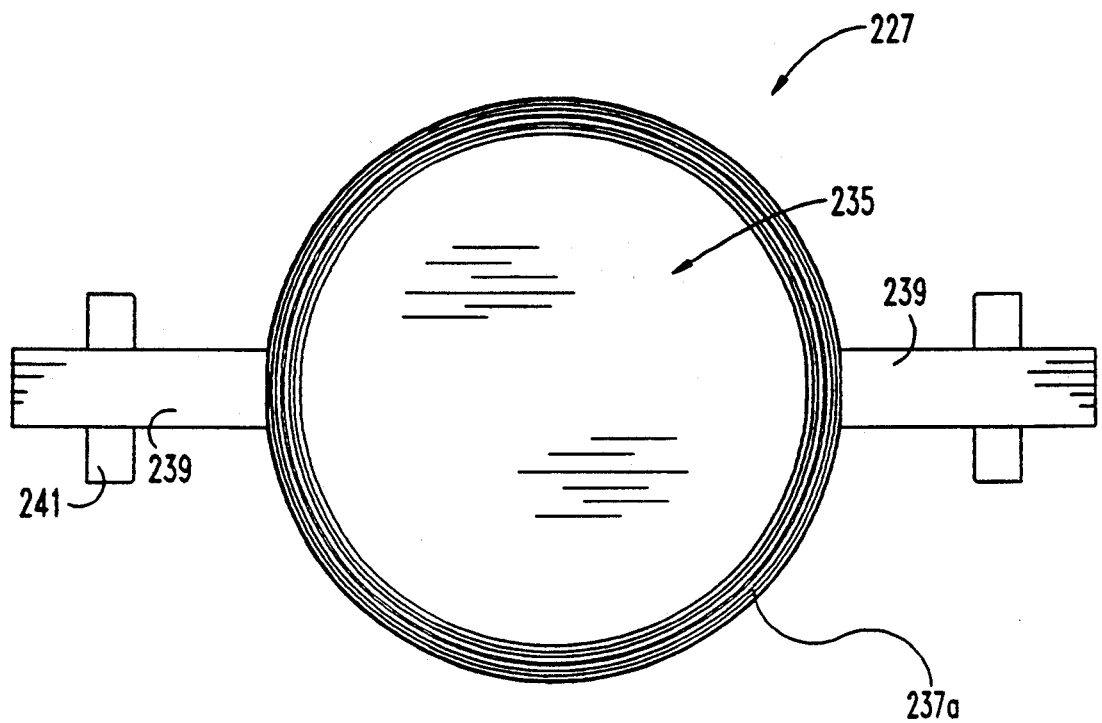
FIG. 11 is a bottom plan view of a second embodiment of a butterfly valve body for use in the present invention having a pair of annular ribs.
Figure 12:
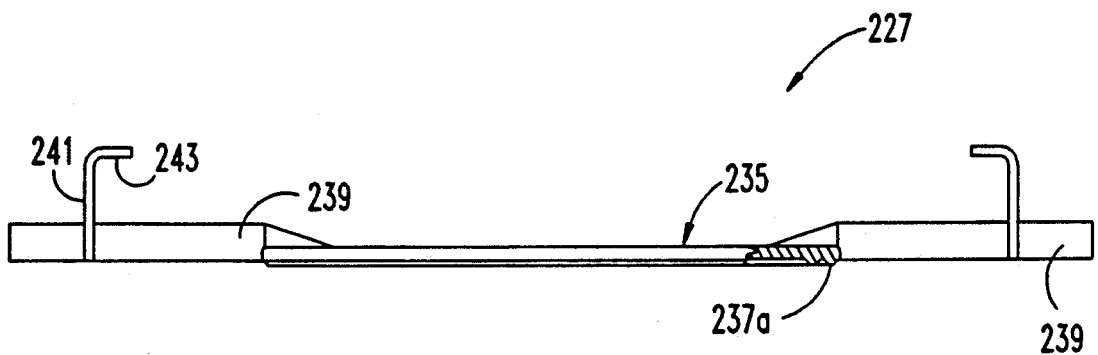
FIG. 12 is a side, partially cut-away view of the valve body of FIG. 11.

FIGS. 8-10 illustrate a typical butterfly valve body, such as valve body 27, in isolation. The valve body includes a generally planar section 35 having a generally planar face 37 on the inside thereof which will mate with a corresponding generally planar face of valve body 29. Note that in the preferred embodiment the middle region of face 37 is ground slightly concave leaving a slight gap between the planar sections of the valve bodies to enhance the tight-fitting perimeter seal between valve body 27 and valve body 29 to prevent dust or other contaminants from getting on face 37 so that it is essentially free from powder from container ports 23 and 25. Planar section 35 is secured to pivot shaft 39 which, as illustrated, is hemicylindrical to mate with a corresponding hemicylindrical pivot shaft of adjacent butterfly valve body 29 to form a cylindrical pivot shaft which is rotatable between the container ports. A pair of handles, such as handle 41, are secured to pivot shaft 39. Handle 41 serves a dual function in the preferred embodiment. The first function is to provide a convenient handle to grasp and pivot the butterfly valve bodies. The second function is to provide locking engagement with a radially projecting locking tab (discussed below) of the corresponding locking member 31. Specifically, in this embodiment locking is provided by having the locking member engage locking surface 43 (see FIGS. 9 and 10) on the bottom surfaces of the horizontal flange of handle 41. Similar locking surfaces are provided on both handles of each butterfly valve body. An elastomeric ring, such as elastomeric ring 28 (see FIG. 5), lines the inner wall of port 23 to provide a snug seal with butterfly valve body 27. A similar seal is provided between valve body 29 and port 25.

Figure 6:
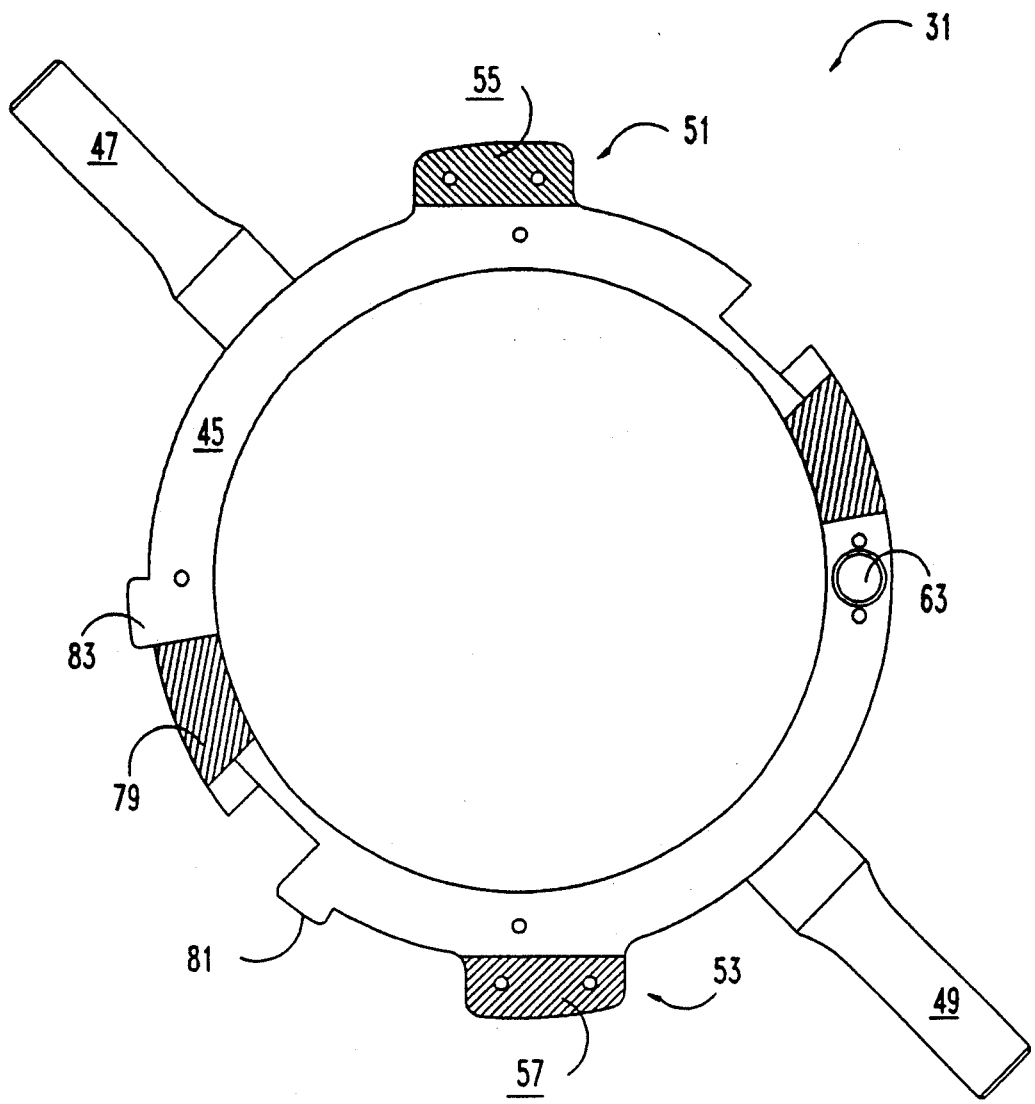
FIG. 6 is a top plan view of one locking member of the device of FIG. 1 shown in isolation.
Figure 7:
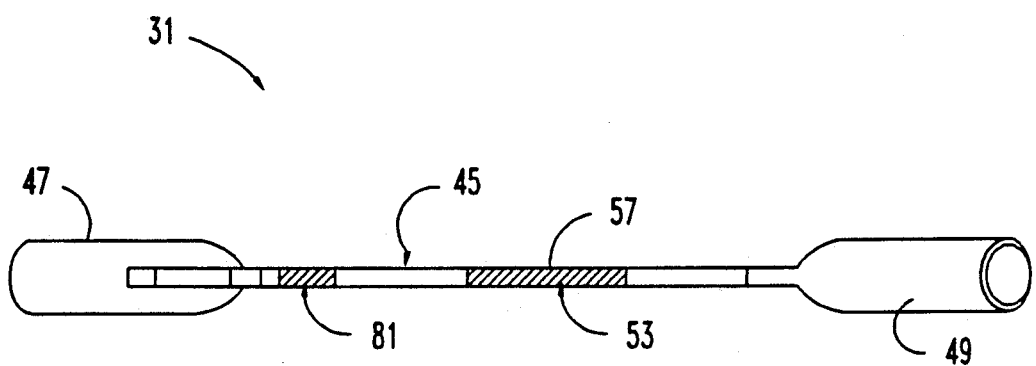
FIG. 7 is a side view of the locking member of FIG. 6.

Referring to FIGS. 6 and 7, locking member 31 is illustrated including annular ring member 45 with two radially projecting handles 47 and 49. A pair of radially projecting tabs 51 and 53 are provided on ring 45 defining locking surface 55 and locking surface 57 respectively. These locking surfaces engage the locking surfaces, such as locking surface 43, on the butterfly valve bodies as illustrated in FIGS. 8-10. In the preferred embodiment, locking surfaces 55 and 57 are made of a softer material than the metal used on surface 43 to prevent galling, it having been found that Delrin brand plastic (offered by Du Pont) is suitable for these surfaces. Similarly, to prevent galling a ring of softer material (e.g. Delrin brand plastic) 58 is provided between locking member 31 and the radial flange 60 (see FIGS. 1 and 5) of port 23. A similar ring of bushing material 62 is provided between locking member 33 and port 25. In operation of valve system 21, when the locking member is rotated circumferentially by applying circumferential force on handles 47 and 49 to slide the locking surfaces together, such as surface 55 in contact with surface 43, pivoting of the butterfly valve bodies about axis A is prevented (see FIGS. 2 and 4). In this locked mode, the two container ports may be separated without having butterfly valve body 27 or 29 inadvertently opening and thereby exposing the contents of material inside the container ports.

Furthermore, in this locked, uncoupled mode the locking members, such as locking member 31, are prevented from inadvertently rotating to an unlocked position by the operation of a spring biased pin and recess arrangement. More specifically, referring to FIG. 5 an axially projecting pin 59 is secured to container port 25 whereas a corresponding recess 61 is provided in container port 23 for receiving pin 59. Inside of recess 61 is a spring biased pin 63 urged into recess 61 by spring 65. Reciprocating pin 63 and spring 65 are mounted to first locking member 31 on its annular ring portion. When valve system 21 is in its locked, uncoupled mode spring 65 urges pin 63 into recess 61, thereby locking container port 23 and locking member 31 against movement circumferentially with respect to each other. However, when the two subassemblies of valve system 21 are placed together in a coupled mode, mating pin 59 contacts pin 63 and urges it out of recess 61, thereby allowing rotation of locking member 31 with respect to container port 23. Furthermore, mating pin 59 and recess 61 provide for proper alignment of the two halves of valve system 21 when being coupled. There is an inverse and hermaphroditic mating pin 67 and recess 69 in container port 23 and container port 25 respectively as illustrated, functioning essentially the same as mating pin 59 and recess 61, with a spring bias pin identical to pin 63 in recess 69 so as to prevent and to allow rotation of locking member 33 with respect to container port 25.

Radially projecting stop 81 contacts prong 73 (see FIG. 4) to prevent over-rotation of locking member 31 in the locked, uncoupled mode. Conversely, stop 83 prevents over-rotation by contacting prong 73 when moving the locking member into the unlocked, coupled mode. Identical stops are provided on locking member 33.

The two subassemblies of container port 23 and of container port 25 are coupled together by the interaction of four locking prongs with the two locking members 31 and 33. Three of the four locking prongs are illustrated as prongs 71, 73 and 75. The fourth prong, which is secured to container port 23, is not illustrated due to the cutaway drawing configuration in FIG. 5, but is located diametrically across from prong 75 similar to the relationship between prongs 71 and 73. In the preferred embodiment, each of the prongs have locking member surfaces in the form of rollers. Prong 73 is typical, having roller 77 thereon. Alternately, the prongs may provide bayonet mounting through slots, holding the ports together (not shown). Similar to surfaces 55 and 57, preferably the rollers are made of a softer material, such as plastic, to prevent galling when brought in engaging contact with the respective locking member. When container port 23 and container port 25 are in a coupled mode, roller 77 acts as a locking surface and is rolled into engagement with locking surface 79 which, in the preferred embodiment, is on annular ring member 45 of the first locking member 31. This engagement is caused by circumferentially rotation of locking member 31 so the system is in the coupled mode. This surface is slightly ramped to facilitate receiving of the roller as the locking member is rotated. In the coupled mode, the remaining three rollers likewise engage similar locking surfaces on the locking members. The invention works best if tolerances are held to within 0.001 inches, particularly on the critical locking surfaces and faces between moving parts.

Furthermore, in the unlocked mode (see FIG. 3) the locking tabs 51 and 53 are no longer in engagement with the handles and locking surface (e.g. locking surface 43) of the butterfly valve bodies, thereby allowing them to pivot about axis A. Accordingly, the present invention provides a locking system which is mutually exclusive between two modes, a coupled mode in which the butterfly valves are free to pivot so as to open and close the valve, and an uncoupled mode in which the respective halves of the butterfly valve are locked in a closed position so as to maintain containment integrity of the system. It is significant that in this configuration in the coupled mode the valve body collectively defined by valve bodies 27 and 29 may be completely pivoted in excess of 180° and even in excess of 360° inside the container ports. This is useful in that there may be times when closing of the butterfly valve may be obstructed by a localized piece of the material in the valve when the valve is rotated in one direction, but that by rotating the valve in an opposite direction the operator may avoid or break up the obstruction and close the valve. As stated before, it is preferable that the respective halves of the valve system are interchangeable and preferably hermaphroditic with one another. In this way, when the various component parts are disassembled, which may readily be done with the present invention for cleaning and/or sterilizing, their reassembly may be done universally without the risk of error in combining improper components. Furthermore, this feature provides versatility in that it facilitates material handling between various vessels. For example, if there are three vessels, vessel A, vessel B and vessel C, each having a corresponding half of valve system 21 including a first container port and a first butterfly valve body, due to their interchangeable and hermaphroditic structure they may be freely connected with one another. In other words, any of the coupling permutations may be achieved such as connecting vessels A and B, vessels A and C, and/or vessels B and C without concern of whether the appropriate valve fittings will match one another.

Another design advantage of this valve is the mating guide pins designed so as to facilitate the mating of the valve halves. The pins permit the mating of the valve halves even when slightly misaligned. This feature is critical when using the valves in an automatic mode. With the broad mating tolerance in the pins this design, robotically mating the valve is practical.

Figure 13:
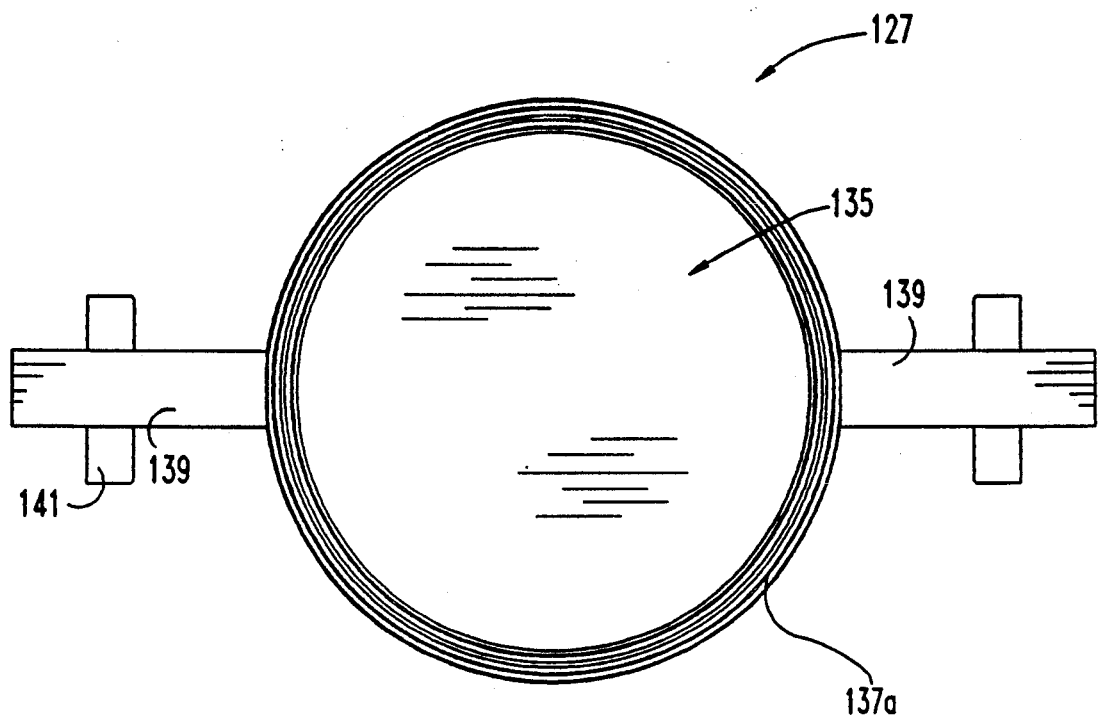
FIG. 13 is a bottom plan view of a second embodiment of a butterfly valve body for use in the present invention having a pair of annular grooves.
Figure 14:
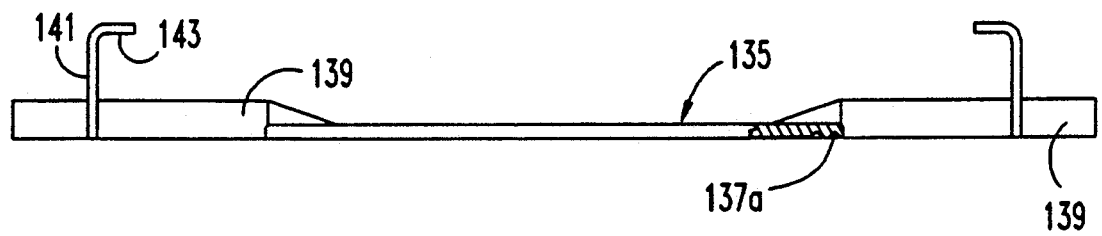
FIG. 14 is a side, partially cut-away view of the valve body of FIG. 13.

Referring to FIGS. 11-15, a second embodiment of the present invention is disclosed in the form of modifications to certain components of the present invention. FIGS. 11-15 utilize analogous reference characters as used in connections with FIGS. 1-10 except that a "1" or "2" is present in the hundredths digit for analogous structure. For example, pivot shaft 239 in FIGS. 11 and 12 and pivot shaft 139 if FIGS. 13 and 14 are analogous to pivot shaft 39 in the previous Figures. Butterfly valve body 227 in FIGS. 11 and 12 differs from the valve body of FIGS. 8 and 9 by the presence of a pair of annular ribs, such as annular rib 237a near the outermost circumference of generally planer section 235 along its inside face. Annular rib 237a mates with a corresponding annular groove 137a illustrated in FIGS. 13 and 14 on valve body 127. The interaction of such annular ribs and grooves or other such projections and recesses around the periphery of planer sections 135 and 235 help provide a better seal so as to prevent dust or other material from contaminating the face to face surfaces of sections 135 and 235. Handles 141 and 241 and locking surfaces 143 and 243 function as previously described with respect to handles 41 and locking surfaces 43. Note that when the modified valve bodies of FIGS. 11-14 are utilized, complete hermaphroditic mating between two respective halves is not present in the embodiment as illustrated. Variations are possible such as having annular ribs on one face of section 137 with annular grooves on an opposite face thereof with corresponding modification of shaft 139 and handle 141 to allow a single part design while providing rib-groove mating as previously described. Alternatively, the single face of section 135 may have both circumferential ribs and grooves in diametrically opposite halves or quadrants to provide sealing while maintaining hermaphroditic mating.

Figure 15:
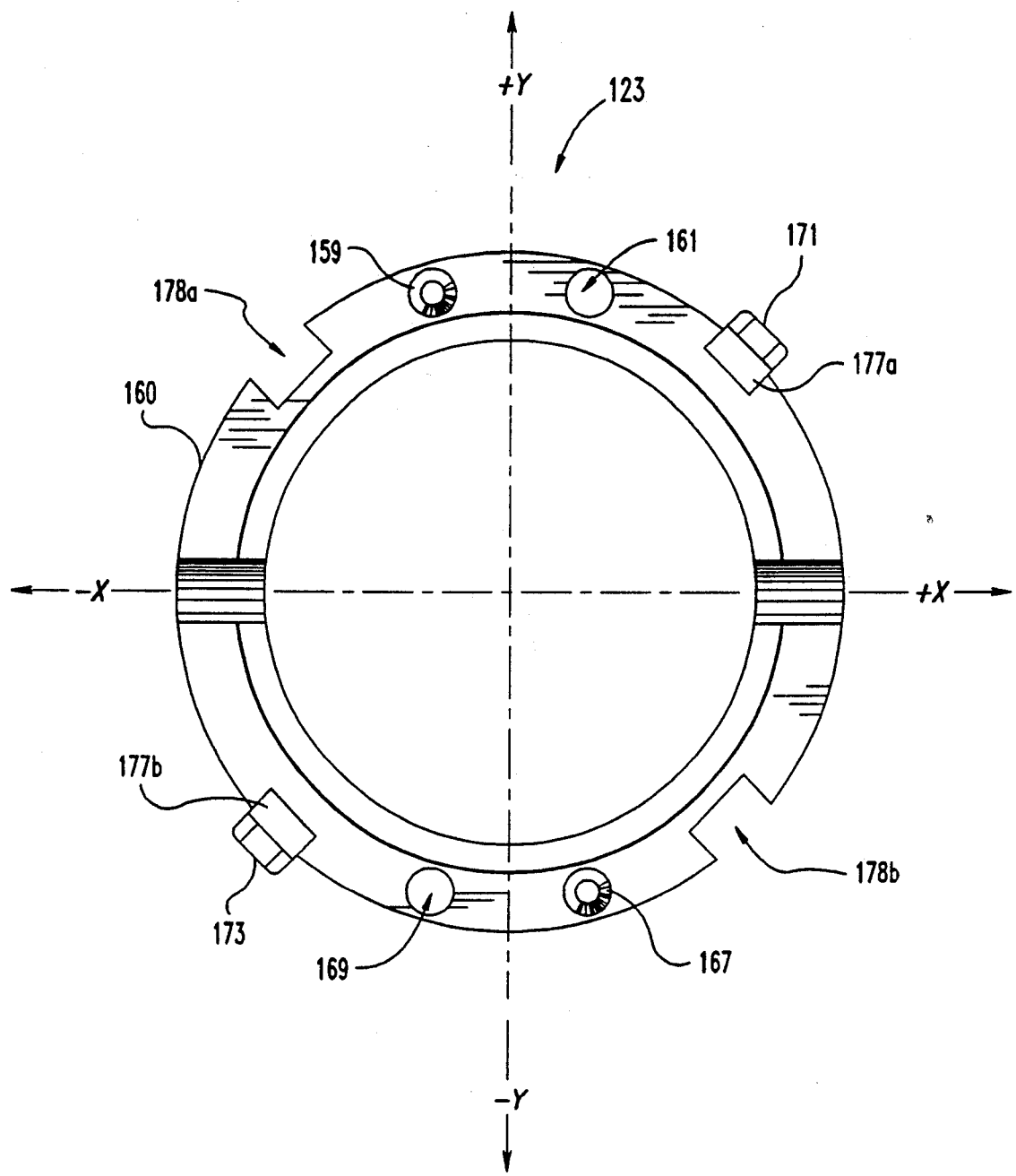
FIG. 15 is a top plan view of a second embodiment of a container port for use in the present invention.

FIG. 15 illustrates a modified construction of the container port of the present invention. Container port 123 is essentially the same as container port 23 except that it provides hermaphroditic mating both about the Y-axis and about the X-axis. This is accomplished by having the axially male protrusion of pin 159 symmetrically across the Y-axis from recess 161 and symmetrically across the X-axis from recess 169. Similarly, axially male protrusion in the form of pin 167 is symmetrically across from the Y-axis from recess 169 and symmetrically across the X-axis from recess 161. Furthermore, roller 177a mounted to prong 171 is symmetrically across the Y-axis from recess 178a and symmetrically across the X-axis from recess 178b. Similarly, roller 177b mounted on prong 173 is symmetrically across the Y-axis from recess 178b and is symmetrically across the X-axis from recess 178a. As illustrated, the +X, +Y quadrant of container port 123 is a mirror image of the −X, −Y quadrant. Likewise, the +X, −Y quadrant is a mirror image of the −X, +Y quadrant. In this way, two container ports as illustrated in FIG. 15 may be hermaphroditically mated about the Y-axis as well as about the X-axis. Note that the X-axis in the illustrated embodiment is the axis of rotation of the two butterfly valve bodies previously described. The illustrated face of flange 160 preferably lies in the X-Y plane, normal to a Z-axis generally along the flow direction through the ports. Accordingly, the configuration of FIG. 15 at least doubles the mating interaction possibilities of the present inventive valve system having two butterfly valve bodies or ball valve bodies with apertures therein.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A valve system, comprising:
   a first container port and a second container port which are uncoupleable and coupleable with respect to each other between an uncoupled mode and a coupled mode respectively, wherein said ports in said coupled mode collectively define a transverse Y-axis and a transverse X-axis defining an X-Y plane;
   a first valve body pivotable about said X-axis, wherein said first valve body in a closed position seals the first port against flow of material therethrough;
   a second valve body pivotable about said X-axis, wherein said second valve body in a closed position seals the second port against flow of material therethrough, wherein in said coupled mode said first and second valve bodies are immediately adjacent each other and are simultaneously pivotable about said X-axis to an open position to allow flow of material through the first and second ports;
   wherein said first container port and said second container port are hermaphroditically interfittable with respect to each other;
   and wherein said container ports have a set of male protrusions and a set of female recess which deviate from the X-Y plane, wherein a given male protrusion has a first interfitting recess symmetrically across said X-axis and a second interfitting recess symmetrically across said Y-axis to allow hermaphroditic mating of said ports both about said X-axis and about said Y-axis.

2. The valve system of claim 1 wherein said first valve body and said second valve body each are butterfly valve bodies and have generally planar faces having and least one set of an interfitting rib and groove around a perimeter thereof, wherein adjacent faces of said adjacent first valve body and second valve body are in contact with each other with said rib and groove set to provide a dust-tight seal therebetween in said coupled mode, whereby in said uncoupled mode said faces of said first and second valve bodies are exposed and are essentially free of dust from the first port and the second port.

3. The valve system of claim 1 wherein in said uncoupled mode said first valve body, said second valve body, said first locking member, and said second locking member are disassembleable apart from each other and apart from the first port and the second port;
   wherein said first valve body is interchangeable with said second valve body; and
   wherein said first locking member is interchangeable with said second locking member.

4. The valve system of claim 1 wherein said first and second valve bodies are butterfly valve bodies and further comprising a first locking member which is rotatable circumferentially with respect to the first port from a first circumferential position to a second circumferential position, wherein in said first circumferential position said first locking member locks said first valve body in said closed position, and wherein in said second circumferential position said first locking member unlocks said second valve body to allow pivoting of said first valve body to said open position.

5. The valve system of claim 4 wherein when said container ports are in said coupled mode with said first locking member in its second circumferential position, said first and second valve bodies are allowed to pivot 180° about said axis to an inverted valve body position, and wherein when said valve bodies are in said inverted valve body position said first and second container ports are uncoupleable with said second valve body mounted in said first container port and with said first valve body mounted in said second container port.

6. The valve system of claim 4 wherein in said second circumferential position said first locking member allows selective pivoting of said first and second valve bodies between said closed position and said open position, wherein said valve bodies are pivotable in excess of 360° about said transverse axis while said first and second container ports are in said coupled mode.

7. The valve system of claim 4 wherein said first locking member in said second circumferential position further locks the first port and the second port together in said coupled mode.

* * * * *

UNITED STATES PATENT AND TRADEMARK OFFICE
CERTIFICATE OF CORRECTION

PATENT NO. : 5,295,507
DATED      : March 22, 1994
INVENTOR(S): Michael Jay Bandy It is certified that error appears in the above-identified patent and that said Letters Patent is hereby corrected as shown below:

In column 1, line 13, please change "relate" to --relates--.
In column 2, line 14, please insert "both" after --mate--.
In column 3, line 48, please insert "21." after --system--.

Signed and Sealed this

Twentieth Day of September, 1994

Attest:

BRUCE LEHMAN

*Attesting Officer*          *Commissioner of Patents and Trademarks*